United States Patent [19]
Dixon

[11] Patent Number: 4,711,343
[45] Date of Patent: Dec. 8, 1987

[54] POWER-AND-FREE CONVEYOR APPARATUS FOR HANDLING PALLET-SUPPORTED WORKPIECES

[75] Inventor: Paul A. Dixon, Belvidere, Ill.

[73] Assignee: Dixon Automatic Tool, Inc., Rockford, Ill.

[21] Appl. No.: 915,241

[22] Filed: Oct. 3, 1986

Related U.S. Application Data

[63] Continuation-in-part of Ser. No. 864,417, May 19, 1986.

[51] Int. Cl.$^4$ .............................................. B65G 37/00
[52] U.S. Cl. .............................. 198/465.2; 104/172.5
[58] Field of Search ............... 198/465.1, 465.2, 465.3, 198/803.01, 803.2; 104/172.1, 172.5, 165; 29/563, 33 P

[56] References Cited

U.S. PATENT DOCUMENTS

| | | | |
|---|---|---|---|
| 3,370,549 | 2/1968 | Livingston | 198/465.1 |
| 4,331,229 | 5/1982 | Kamm | 198/465.2 |
| 4,619,205 | 10/1986 | Sticht | 198/465.2 |

*Primary Examiner*—Joseph E. Valenza
*Attorney, Agent, or Firm*—Leydig, Voit & Mayer

[57] ABSTRACT

Workpieces are supported on pallets which are advanced in an endless path by continuously driven power-and-free conveyor means adapted to permit each pallet to dwell in a work station when the pallet is stopped in the work station during continued driving of the conveyor. The conveyor means are formed by several self-contained modules detachably secured to one another in end-to-end relation and each including its own track for supporting the pallets, its own power-and-free conveyor for advancing the pallets along the track and its own motor for driving the conveyor. Curved end modules may be linked together with straight side modules in various arrangements to form conveyor systems of different capacities and shapes.

12 Claims, 10 Drawing Figures

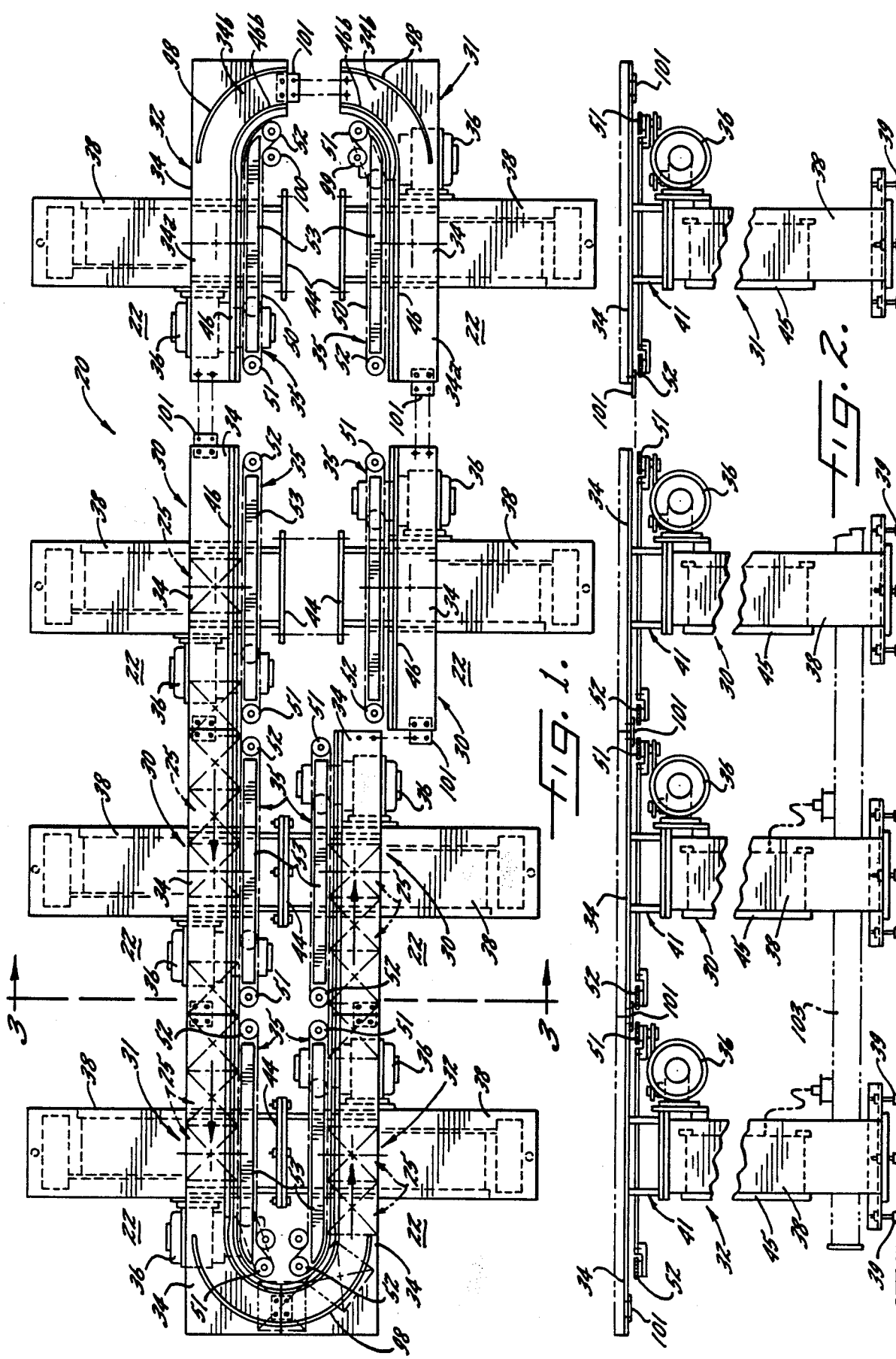

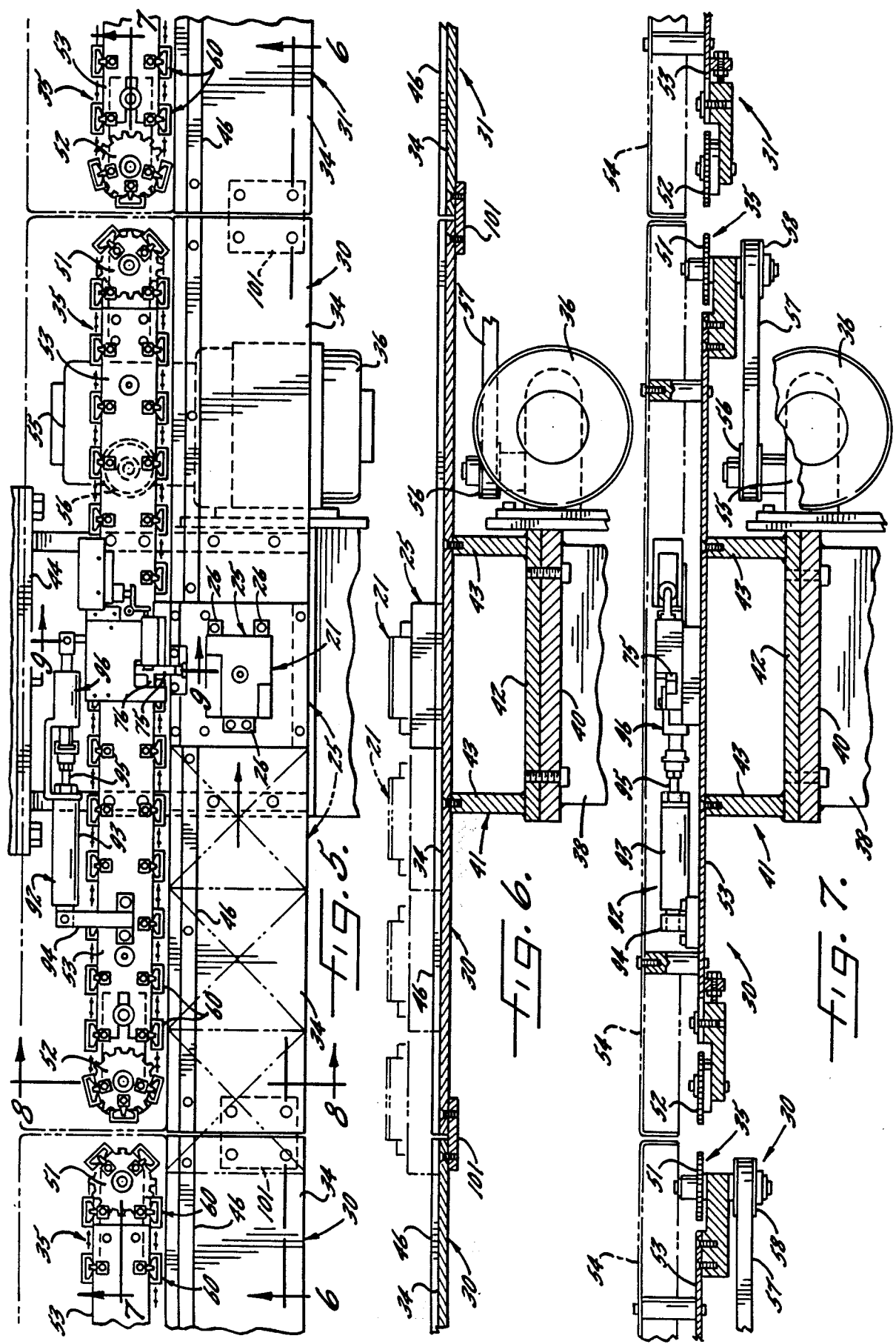

POWER-AND-FREE CONVEYOR APPARATUS FOR HANDLING PALLET-SUPPORTED WORKPIECES

CROSS-REFERENCE TO A RELATED APPLICATION

This application is a continuation-in-part of my co-pending application Ser. No. 864,417, filed May 19, 1986.

BACKGROUND OF THE INVENTION

This invention relates generally to apparatus for handling workpieces and, more particularly, to apparatus for handling workpieces which are supported on pallets adapted to be advanced by a power-and-free conveyor.

A power-and-free conveyor is a continuously driven conveyor which is adapted to advance a row of pallets along a predetermined path. When each pallet of the row is stopped in a work station, the conveyor allows the pallet to dwell in the work station while an operation is performed on the workpiece on the pallet and while driving of the conveyor continues.

In many arrangements of the above type, the conveyor advances the pallets in a closed circuit around an endless and generally horizontal path having two opposing straight sides and two opposing curved ends. Spaced along the path are several work stations where various operations are performed on the workpieces as the pallets dwell at successive stations.

SUMMARY OF THE INVENTION

The general aim of the present invention is to provide new and improved power-and-free conveyor means which may be easily constructed in various shapes and of virtually any length to compactly accommodate the number of work stations required for a given overall operation and which may be easily expanded if it becomes desirable to place additional work stations in the original installation.

A more detailed object of the invention is to achieve the foregoing by constructing the overall conveyor with standardized and self-contained modules which may be easily linked together in any number and in various arrangements to form a conveyor having an optimum length and shape for accommodating the work stations.

Another object of the invention is to provide novel straight and curved modules adapted to be linked together to cause the pallets to move around a generally racetrack-shaped track and each having its own pallet-supporting track and its own power-driven power-and-free conveyor for advancing the pallets along the track to the track of the next module.

Still another object is to provide straight and curved conveyor modules having conveyors of equal length and all driven in a direction so as to pull the pallets around the path.

The invention also resides in the unique and relatively simple construction of gripping clamps forming part of the power-and-free conveyors of the modules and adapted to either advance the pallets or to slip frictionally on the pallets.

These and other objects and advantages of the invention will become more apparent from the following detailed description when taken in conjunction with the accompanying drawings.

BRIEF DESCRIPTION OF THE DRAWINGS

FIG. 1 is a top plan view, in partially exploded form, of new and improved workpiece handling apparatus incorporating the unique features of the present invention.

FIG. 2 is a front elevational view of the apparatus shown in FIG. 1.

FIG. 5 is an enlarged top plan view of one of the straight conveyor modules shown in FIG. 1.

FIGS. 6 and 7 are fragmentary cross-sections taken substantially along the lines 6—6 and 7—7, respectively, of FIG. 5.

DETAILED DESCRIPTION OF THE PREFERRED EMBODIMENT

Figure 3:
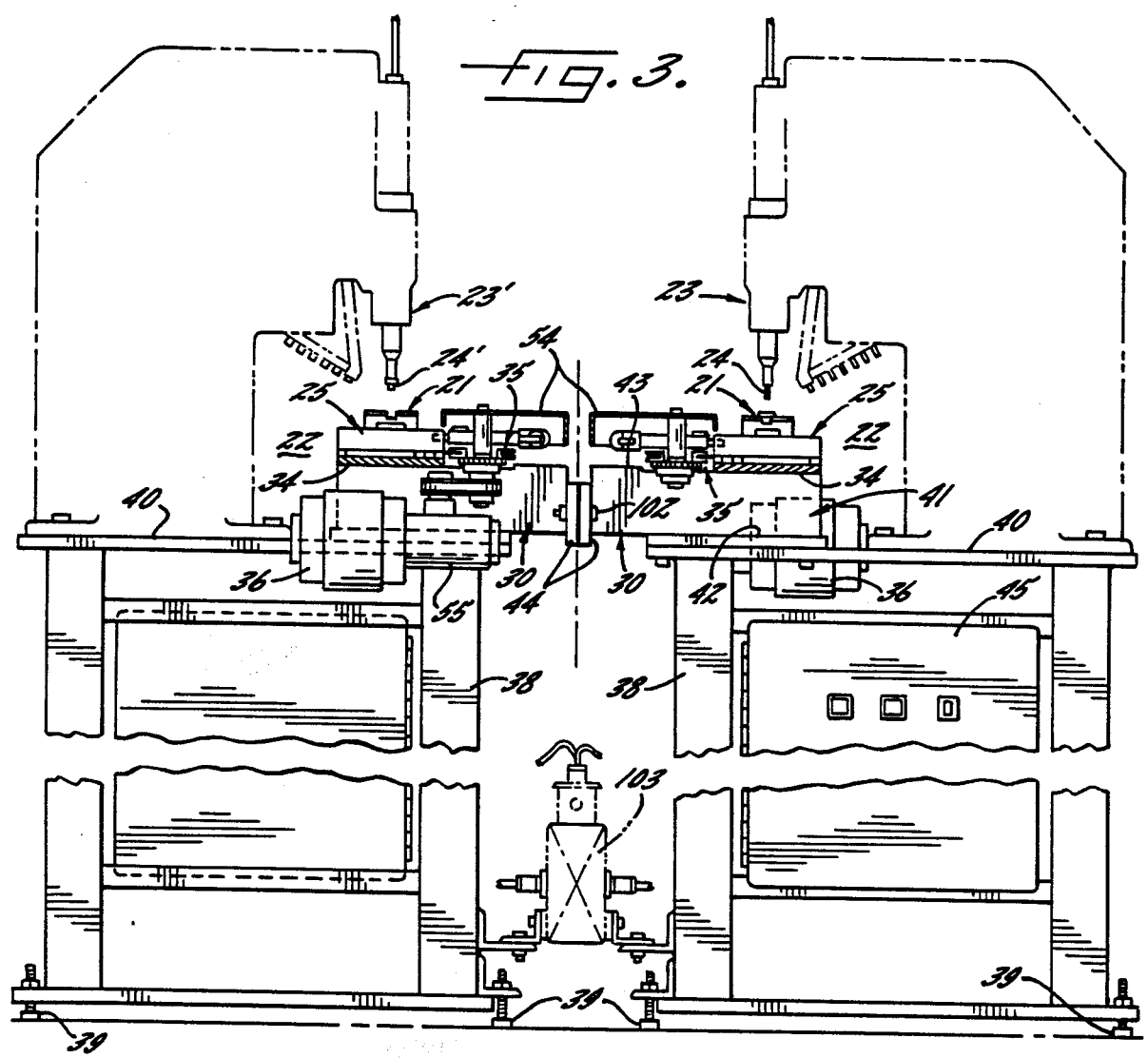
FIG. 3 is an enlarged fragmentary cross-section taken substantially along the line 3—3 of FIG. 1.

As shown in the drawings for purposes of illustration, the invention is embodied in apparatus 20 for handling workpieces 21 (FIG. 8) and specifically in apparatus for advancing a series of workpieces along a predetermined path through a plurality of work stations 22 (FIGS. 1 and 3) where operations are performed on the workpieces, there herein being a total of eight work stations. In this specific instance, each workpiece has been shown as consisting of a lower block 21a (FIG. 8) and an upper plate 21b. At one of the work stations 22 (see FIG. 8 and the right-hand side of FIG. 3), a power-operated assembly machine or fastener driver 23 of the type shown in Dixon U.S. Pat. No. 3,675,302 acts to drive a screw 24 through the plate 21b and into the block 21a and thereby fasten the two together to form a unitary assembly 21. At another work station (see, for example, the left side of FIG. 3) a similar fastener driver 23' may thread a nut 24' onto a bolt (not shown) carried by the workpiece. It will be appreciated that many other workpieces different from those specifically shown may be handled by the apparatus and that many varied operations may be performed at the different work stations 22.

Herein, the workpieces 21 are carried by and are fixtured on a row of end-to-end pallets 25 which support the workpieces as the latter are advanced through the work stations 22. Each pallet comprises a generally flat plate whose upper side carries suitable fixturing clamps 26 (FIGS. 5 and 8) for holding the workpiece rigidly in a predetermined position on the pallet.

Advance of the pallets 25 through the work stations 22 is effected by continuously driven power-and-free conveyor means of the type which normally advance the pallets but which are capable of allowing various ones of the pallets to dwell in the work stations while driving of the conveyor means continues. Herein, the conveyor means advances the pallets in a closed circuit and around an endless, horizontal and generally racetrack-shaped path. As shown in FIG. 1, the path has opposing stright sides which are located between opposing curved ends.

In accordance with the present invention, the apparatus 20 includes standardized straight modules 30 at the sides of the racetrack-shaped path along with standardized curved modules 31 and 32 at the ends of the path. Each module includes its own track 34 for supporting the pallets, its own power-and-free conveyor 35 for advancing the pallets on its track and its own motor 36 for driving its conveyor. The modules are adapted to be detachably linked together in end-to-end relation and, by virtue of the modular construction, the overall apparatus may be made as long as necessary to accommodate the required number of work stations 22 but without being needlessly long to waste floor space or to require excess equipment. In addition, the modular construction enables the original system to be easily expanded simply by placing additional modules in the system.

The particular apparatus 10 which has been shown includes four straight modules 30, there being two modules along each straight side of the racetrack-shaped path. The four straight modules are identical and thus a description of one will suffice for all.

Each straight module 30 includes an upright supporting stand 38 (FIG. 3) having lower vertically adjustable leveling feet 39 and an upper horizontal platform 40. Mounted on the platform is a base 41 for supporting the track 34 and conveyor 35 of the module, the platform also supporting an assembly machine 23, 23' as shown in FIG. 3. The base 41 is formed by a horizontal plate 42 (FIG. 8) on the platform, by two spaced side plates 43 upstanding from the horizontal plate and by an upright inner flange 44 rigid with and extending between the inner ends of the side plates. The stand 38 may have a compartment for control equipment for the assembly machine 23, 23', the compartment being closed by a hinged panel 45 (FIG. 3).

Figure 4:
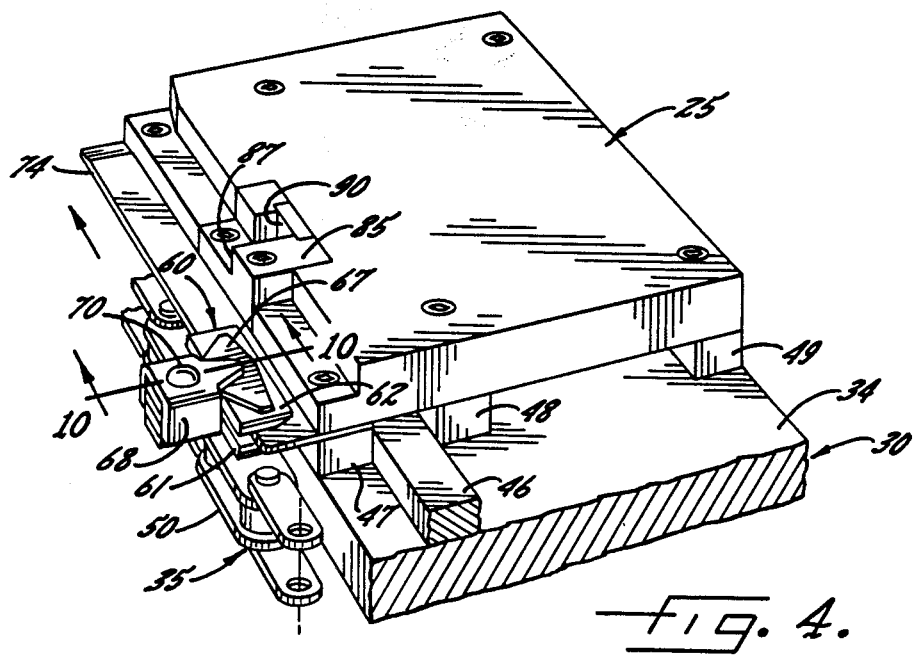
FIG. 4 is a perspective view of a pallet and of a portion of a power-and-free conveyor.

The track 34 of each straight module 30 is a straight, elongated and horizontal plate rigidly supported on the side plates 43 of the base 41 and extending equidistantly past opposite sides of the stand 38 so that the assembly machine 23, 23' is centered lengthwise of the track (see FIGS. 2, 4 and 6). To guide the pallets 25 along the track, guide means in the form of an elongated rail 46 (FIG. 4) is fixed to and extends along the upper side of the track and fits slidably between two transversely spaced guide means or rails 47 and 48 rigid with and depending from the underside of each pallet 25. A third rail 49 on the underside of each pallet 25 is spaced transversely from the rails 47 and 48 and coacts with the latter to hold the underside of the pallet in vertically spaced relation with the upper side of the track.

Figure 9:
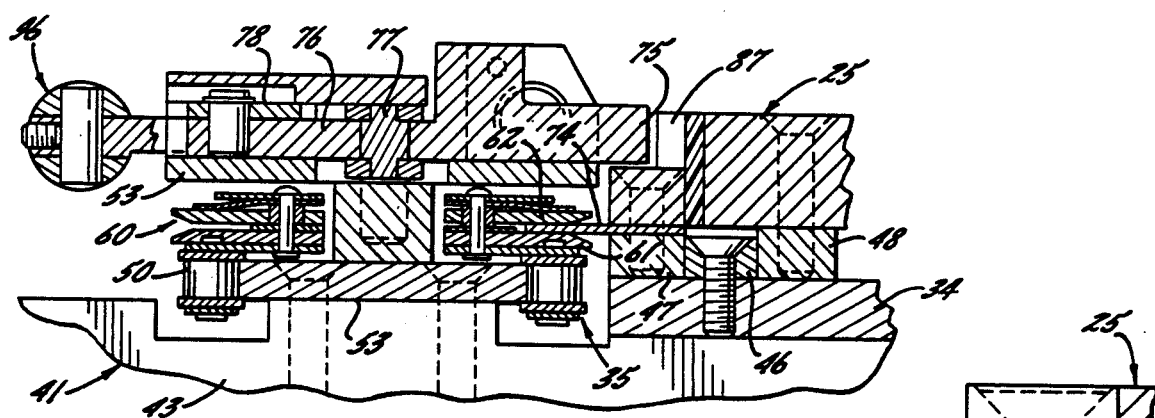

The power-and-free conveyor 35 of the module 30 is located along the inner side of the track 34. The conveyor comprises a roller chain 50 (FIG. 4) trained around driving and driven sprockets 51 and 52 (FIG. 7). Between the sprockets, the chain 50 is guided by a plate 53 (FIGS. 5 and 9) which also supports the sprockets and which is rigid with the side plates 43 of the base 40. The outer run of the chain 50 is the active run which advances the pallets 25, and in order to effect optimum driving of the chain, the driving sprocket 51 is located at the downstream end of the conveyor 35. Inverted dish-shaped guards 54 (FIGS. 3 and 7) are located above the chain and the sprockets to shield the same.

The motor 36 for driving the chain 50 is an electric motor which is attached to the downstream side of the stand 38 beneath the plate 53. The motor is connected directly to and is operable to drive a speed reducer 55 (FIG. 7) which acts through a pulley 56 and an endless belt 57 to drive a pulley 58 coaxial with the driving sprocket 51. The motor is rotated in a direction so as to effect counterclockwise rotation of the driving sprocket and thereby cause the outer run of the chain 50 to advance in a downstream direction. As a result, and because of the downstream location of the driving sprocket, the chain pulls the pallets 25 along the track 34.

Advantegeously, the conveyor 35 includes unique clamps 60 which normally grip the pallets 25 to advance the pallets along the track 34 and through the work station 22 but which automatically slip frictionally along each pallet when the latter is stopped and thereby allow the pallet to dwell in the work station while driving of the chain continues. The clamps are spaced from one another along the chain 50 and as shown most clearly in FIGS. 4 and 10, each clamp includes a pair of lower and upper jaws 61 and 62 which are adapted to move toward and away from one another to either grip the pallets tightly or to slip frictionally along the pallets. The lower jaw 61 of each clamp 60 is a generally T-shaped plate and overlies a T-shaped connecting link 63 (FIG. 10) which is secured between two adjacent links of the chain 50 by vertical pins 64. Those pins dowel into recesses in the lower side of the jaw 61 and prevent the jaw from shifting edgewise relative to the connecting link 63.

The upper jaw 62 of each clamp 60 is shaped generally the same as the lower jaw 61 and is spaced vertically from the latter by a thin block 66 (FIG. 10) which is sandwiched between the tongue portions of the two T-shaped jaws. A generally T-shaped leaf spring 67 overlies the upper jaw 62 and is held in place by a clamp 68 which prevents the spring and the upper jaw 62 from shifting edgewise relative to the lower jaw 61. As shown in FIG. 4, the clamp 68 is of inverted U-shaped configuration and is formed with a pair of depending ears which straddle the tongue portions of the spring 67, the jaws 62 and 61 and the connecting link 63. A rivet 70 (FIG. 10) extends through holes in such tongue portions and also through a hole in the spacer block 66. Encircling the rivet and sandwiched between the spacer block 66 and the spring 67 is a spacer bushing 71 which is disposed in the hole in the tongue portion of the upper jaw 62 and which holds the tongue portion of the spring 67 against the lower side of the clamp 68 and in upwardly spaced relation from the tongue portion of the upper jaw.

Figure 10:
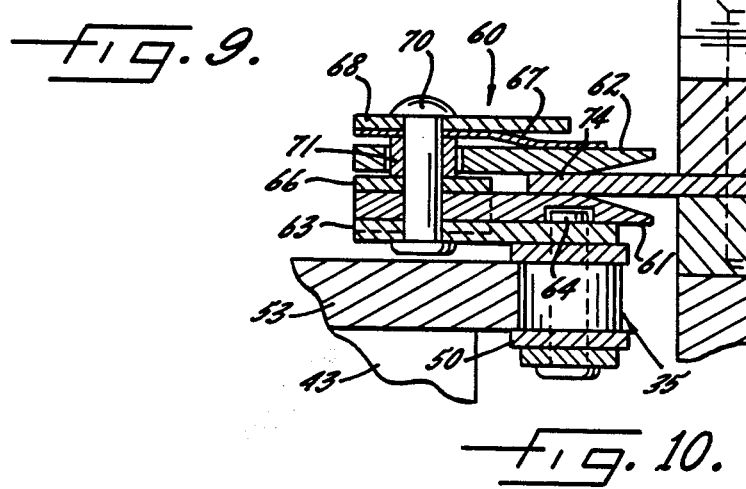
FIG. 10 is an enlarged fragmentary cross-section taken substantially along the line 10—10 of FIG. 4.

As shown most clearly in FIG. 10, the leaf spring 67 includes an elongated portion bent downwardly from the tongue portion of the spring and biased downwardly against the upper jaw 62. The spacer block 66 serves as a fulcrum for the upper jaw 62 while the spacer bushing 71 allows limited pivoting of the upper jaw on the rivet 70 and toward and away from the lower jaw 61. As a result, the upper jaw is pressed downwardly toward the lower jaw by the spring 67 but is permitted to pivot upwardly relative to the lower jaw. The spacer block 66 prevents the upper jaw 62 from completely closing against the lower jaw 61 while part of the clamp 68 overlies the elongated portion of the spring 67 to limit upward pivoting of the upper jaw and prevent overstressing of the spring.

The jaws 61 and 62 of the clamps 60 are adapted to frictionally grip elongated lips 74 (FIGS. 4 and 10) carried by the pallets 25 adjacent the guide rails 47 thereof, each lip extending along the entire length of the pallet and overlying the conveyor chain 50. The jaws of the clamps straddle the lip of each pallet and, as long as the pallet is free to move along the track 34, the springs 67 of the clamps press the jaws into tight engagement with the lip to cause the jaws to advance the pallet. If a given pallet is stopped, however, the springs yield to enable the upper jaws 62 of the clamps to pivot upwardly from the lower jaws 61 and thereby permit the clamps simply to slip frictionally along the lips 74 without advancing the pallet. The leading edges of the jaws 61 and 62 are beveled inwardly so that the trailing end of the lip 74 of a stopped pallet may cam the jaws apart and thereby permit the jaws to straddle the lip.

With the foregoing arrangement, the clamps 60 of the continuously driven conveyor 35 advance successive pallets 25 into the work station 22 of the module and then slip frictionally on each pallet when such pallet is stopped in the work station. Trailing pallets are stopped by the pallet in the work station and thus the clamps also slip with respect to those pallets. After the assembly machine 23, 23' has performed an operation on the pallet stopped in the work station 22, that pallet is released from a stopped condition in the work station and, at such time, the clamps again tightly grip the pallets to advance the completed pallet out of the work station and to advance the next pallet into the work station.

Each pallet 25 which approaches the work station 22 is gradually decelerated and cushioned by a stop 75 (FIG. 9) which, after stopping the pallet in the work station, locks the pallet rigidly in an accurately fixtured position so as to insure that the workpiece 21 is properly located with respect to the assembly machine 23, 23'.

Herein, the stop 75 is defined by an elongated locator bar or finger which is part of a lever 76 (FIG. 9) disposed in a horizontal plane and pivotally mounted by a vertical pivot pin 77 to swing back and forth on a slide block 78. The slide block is supported on the guide plate 53 for the chain 50 to reciprocate transversely toward and away from the track 34.

Figure 8:
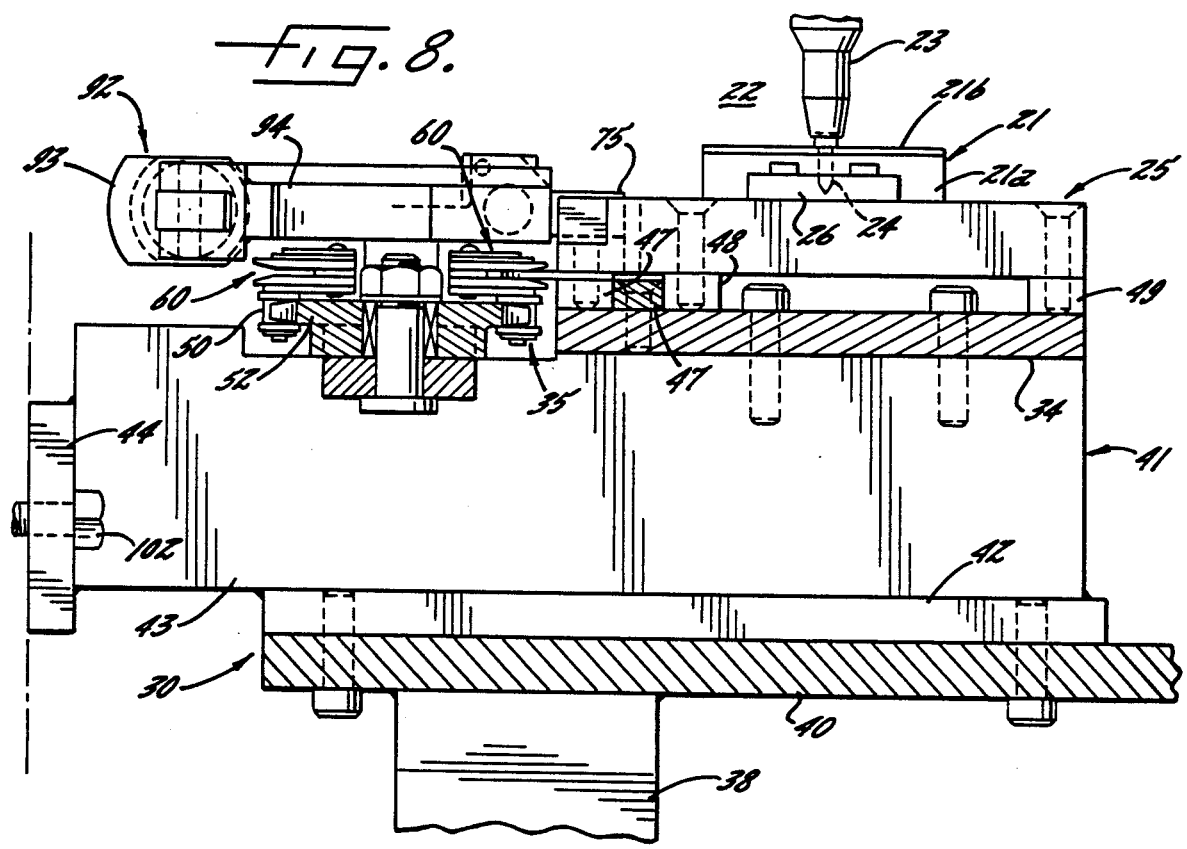
FIGS. 8 and 9 are enlarged fragmentary cross-sections taken substantially along the lines 8—8 and 9—9, respectively, of FIG. 5.

As each pallet 25 approaches the work station 22, the stop lever 76 is positioned as shown in FIG. 8 to cause the stop finger 75 to lie in the path of a stop block 85 (FIG. 4) which is secured to the upper side of each pallet immediately above the guide rail 47 and about midway along the length of the pallet. When a stop shoulder 87 on the stop block 85 engages the stop finger 75, continued movement of the pallet into the work station 22 causes the stop lever 76 to pivot about the pin 77 and to move generally along the path of the pallet through a limited distance in the direction of travel of the pallet. As an incident thereto, the stop finger 75 cushions the pallet to a gradual stop.

Movement of the pallet 25 into the work station 22 and swinging of the stop lever 76 continue until the stop finger 75 is disposed at right angles to the pallet and is stopped. As the finger 75 is stopped, it acts to stop the pallet 25 in the work station 22. Thereafter, the clamps 60 of the conveyor 35 simply slip frictionally past the lip 74 of the pallet to allow the pallet to dwell in the work station.

Immediately after the pallet 25 is stopped in the work station 22, the stop finger 75 and the slide 76 are shifted transversely outwardly along a linear path to cause the stop finger to move further into the path of the pallet and to lock the pallet in a rigidly fixtured position in the work station. To effect the fixturing, the stop block 85 on the pallet 25 is formed with a locator or socket 90 (FIG. 4) disposed outwardly of the stop shoulder 87. The socket 90 is complementary in cross-sectional size and shape to the cross-sectional size and shape of the stop finger 75 and thus the stop finger dowels tightly but slidably into the socket when the stop finger is shifted outwardly. The clamps 60 slipping frictionally along the lip 74 of the stopped pallet force the trailing side of the socket 90 tightly against the finger and thus any longitudinal clearance between the finger and the socket is taken up so as to fixture the pallet in an accurate longitudinal position in the work station 22. In addition, the same stop finger serves to lock the pallet rigidly in a transverse position in the work station. As the stop finger 75 is shifted outwardly, its free end engages and presses tightly against the closed end of the socket 90 to force the guide rail 47 of the pallet into tight face-to-face engagement with the opposing rail 46 of the track 34. As a result of such tight engagement, the pallet is locked rigidly in a precisely established transverse position in the work station 22.

After the work operation has been completed on the workpiece 21 on the accurately fixtured pallet 25 in the work station 22, the stop finger 75 is retracted linearly out of the socket 90 and out of the path of the pallet to a position just clear of the stop shoulder. As a result, the pallet 25 in the work station is released by the stop finger and is immediately gripped tightly by the clamps 60 and advanced out of the work station. During such advance the stop lever 76 is swung about the pin 77 and generally along the path of the pallets in a direction opposite to the direction of travel of the pallets. At the same time, the lever is shifted transversely outwardly into the path of the pallets to bring the stop finger 76 back into position to catch the stop shoulder of the next pallet.

The details of construction and operation of the top finger 75 and the manner of actuating the finger do not form part of the present invention. In general, it may be said that a reversible reciprocating pneumatic actuator 92 (FIG. 5) includes a cylinder 93 having one end pivotally connected to a mounting bracket 94 secured to the chain guide plate 53. Extending out of the other end of the cylinder is an elongated rod 95, which, when reciprocated, acts through mechanism indicated generally at 96 to effect movement of the stop finger. Reference may be made to the aforementioned Dixon U.S. Application Ser. No. 864,417 for a detailed disclosure of the stop finger and the manner of actuating the same.

As mentioned above, the other three straight modules 30 are precisely identical to the straight module which has just been described although each module may be equipped with a different type of assembly machine 23, 23' or other machine for operating on the workpieces 21. The curved modules 31 and 32, while being exactly similar in principle and operation to the straight modules, are of somewhat different construction in order to effect advancement of the pallets 25 around the curved ends of the racetrack-shaped path.

In this instance, there are two curved modules 31 and 32 at each end of the path, the modules 31 being identical to one another and being located at two diagonally opposite corners of the path while the modules 32 which are identical to one another are located at the other diagonally opposite corners of the path. Although the modules 31 and 32 are very similar in construction, they are not identical to one another and, for purposes of convenience, the modules 31 will be referred to as left-hand or exit modules while the modules 32 will be referred to as right-hand or entry modules. That is to say, each exit module 31 permits the pallets 25 to leave a straight side portion of the path for travel around a curved end while each entry module 32 permits the pallets to enter a straight portion of the path after completing travel around a curved end.

An exit module 31 will be described first with specific reference to the exit module at the lower right corner of FIG. 1. That module is identical to a straight module 30 except for the differences to be enumerated here. First, the track 34 of the exit module includes a straight upstream track section 34a and a curved downstream track section 34b which, when viewed from inside of the racetrack-shaped path, extends to the left from the straight section 34a. The straight section 34a is somewhat shorter than the straight tracks 34 of the straight modules 30 and ends just after clearing the downstream end of the stand 38 and the assembly machine 23, 23' thereon. The curved track section 34b merges smoothly with the straight section and extends around an arc of ninety degrees. Formed adjacent the inner margin of the curved section 34b is a curved elongated rail 46b (FIG. 1) which is narrower than the rail 46 of the straight section 34a so as to provide adequate clearance between the guide rails 47 and 48 of the pallet 25 for purposes of enabling the pallet to move around the curve. To help maintain the pallets stable as they travel around the curve, another curved guide rail 98 is located adjacent the outer side of the curved track section 34b and very loosely engages the inner side of the outer rails 49 of the pallets.

The outer side of the downstream end of the chain guide plate 53 of the curved exit module 31 is curved generally in accordance with the curvature of the curved track section 34b as shown in FIG. 1. In addition, the driving sprocket 51 of the curved module 31 is offset inwardly from the downstream end of the guide plate 53 and is positioned adjacent an idler sprocket 99 which engages the chain 50. As a result of this arrangement, the chain 50 is caused to curve generally in accordance with the curved track section 34b so as to be capable of advancing the pallets 25 therearound. The chain 50 of each curved exit module 31 has exactly the same linear length as the chains of the straight modules 30 so as to enable standardized chains to be used for both types of modules. And again, the motor 36 and driving sprocket 51 of each curved exit module 31 is located adjacent the downstream end thereof with the driving sprocket acting to pull on the outer run of the chain 50 as the pallets are advanced.

Each curved entry module 32 is the same as the adjacent curved exit module 31 except that the curved track section 34b of the entry module extends from the right of the straight track section 34a thereof when the entry module is viewed from inside of the racetrack-shaped path. As is apparent from FIG. 1, the drive motor 36 and driving sprocket 51 of the entry module 32 are located adjacent the downstream end of the straight track section 34a so as to pull on the outer run of the chain 50. As a result, the driven sprocket 52 is positioned adjacent the curved upstream track section 34a, is offset inwardly from the driving sprocket 52 and coacts with an idler sprocket 100 to cause the chain 50 to curve generally in accordance with the curved track section 34b and advance the pallets therearound. The chain 50 of the entry module 32 has the same linear length as the chains of the other modules.

In the arrangement of the apparatus 20 shown in FIG. 1, two curved modules 31 and 32 are located end-to-end with one another at each end of the path while two straight modules 30 are located end-to-end along each side of the path with one of the straight modules 30 disposed end-to-end with an exit module 31 and with the other of the straight modules disposed end-to-end with an entry module 32. The various modules are rigidly but detachably fastened together by tongues 101 (FIGS. 1 and 6) projecting upstream from the upstream end of the lower side of the track 34 of each module and bolted releasably to the underside of the downstream end of the track of the adjacent upstream module. Moreover, opposing straight modules are additionally fastened together by bolts 102 (FIGS. 3 and 8) extending through the inner flanges 44 of the bases 40 of the modules and holding such flanges in tight face-to-face engagement. An air manifold and electrical conduit box 103 (FIGS. 2 and 3) extends longitudinally between opposing side modules and may be tapped to supply electrical power and pressurized air to the modules.

In operation, the pallets 25 are advanced by the individual conveyors 35 of the various modules 30, 31 and 32 and are stopped momentarily at the different work stations 22 to enable various operations to be performed on the workpieces. If a pallet approaching a work station is stopped by a pallet in the station, the following pallet simply dwells until the work station is clear. If several pallets stack up in front of a given station, proximity detectors (not shown) deenergize one or more upstream motors 36 in order to avoid a substantial build up of force against the pallets.

It will be apparent from FIG. 1 that the system formed by the modules 30, 31 and 32 is extremely flexible. In essence, the modules may be simply "plugged into" the system and into one another. Thus, any additional number of straight modules 30 may be placed in the installation if a greater number of work stations 22 is required and, conversely, only one straight module 30 need be placed along each straight side of the path for a less complex system. Indeed, the straight modules may be eliminated altogether for a system requiring four or less work stations. If available floor space considerations favor a different geometric arrangement, one or more straight modules 30 may be installed at each end of the path between two curved modules 31 and 32 and the system operated with or without straight modules between curved modules 31 and 32 at opposite ends of the path. Accordingly, the apparatus 10 easily lends itself not only to systems of various capacities but also to systems of various shapes.

I claim:

1. Apparatus for handling workpieces and comprising a row of pallets each adapted to hold a workpiece, continuously driven power-and-free conveyor means for advancing said pallets in a closed circuit along a generally horizontal and endless path having opposing straight sides and opposing curved ends, said conveyor means being operable to advance said pallets through at least one work station along said path and being operable to allow said pallets to dwell along said path when said pallets are stopped during continued driving of said conveyor means, said apparatus being characterized in that said conveyor means comprise a plurality of at least four modules located along the sides and ends of said path, each of said modules comprising (a) a generally horizontal individual track for supporting said pallets, (b) an individual power-driven endless conveyor for advancing said pallets along said track and for allowing the pallets to dwell on said track when the pallets are stopped during continued driving of the conveyor and (c) an individual motor for continuously driving said conveyor; there being two modules adjacent each end of said path with the track and conveyor of each of such modules having a curved section extending along a portion of the curved end of the path and having a straight section extending along a portion of one of the straight sides of the path, the track and conveyor of each module being disposed in end-to-end relation with the tracks and conveyors of two other modules, and means for detachably holding said modules in rigid end-to-end relation, each of said pallets including a lip extending generally along said path and projecting toward said conveyors, each of said conveyors comprising a series of spaced clamps for tightly gripping the lips of said pallets to advance said pallets along said path, said clamps slipping frictionally along the lip of each pallet when the pallet is stopped and as driving of said conveyors continues.

2. Apparatus as defined by claim 1 in which a machine for operating on said workpieces is supported on each of said modules.

3. Apparatus for handling workpieces and comprising a row of pallets each adapted to hold a workpiece, continuously driven power-and-free conveyor means for advancing said pallets along a generally horizontal and generally racetrack-shaped endless path having opposing straight sides and opposing curved ends, said conveyor means being operable to advance said pallets through a plurality of work stations along said path and being operable to allow said pallets to dwell along said path when said pallets are stopped during continued driving of said conveyor means, said apparatus being characterized in that said conveyor means comprise straight modules located along the sides of said path and curved modules located along the ends of said path, each of said modules comprising (a) a generally horizontal individual track for supporting said pallets, (b) an individual power-driven endless conveyor for advancing said pallets along said track and for allowing the pallets to dwell on said track when the pallets are stopped during continued driving of the conveyor, and (c) an individual motor for continuously driving said conveyor; the tracks of said straight and curved modules being straight and at least partially curved, respectively, the conveyors of said straight and curved modules being adapted to advance said pallets along straight and at least partially curved courses, respectively, the track and conveyor of each module being located between and being disposed in end-to-end relation with the tracks and conveyors of two other modules, each of said pallets including a lip extending generally along said path and projecting toward said conveyors, each of said conveyors comprising a series of spaced clamps for tightly gripping the lips of said pallets to advance said pallets along said path, said clamps slipping frictionally along the lip of each pallet when the pallet is stopped and as driving of said conveyors continues.

4. Apparatus as defined in claim 3 in which two curved modules are located end-to-end with one another at each end of said path, the track of each of said curved modules having one end disposed end-to-end with the track of the adjacent curved module and having an opposite end disposed end-to-end with the track of a straight module.

5. Apparatus as defined in claim 4 in which the track of each curved module is shaped to support said pallets for advancement around an arcuately curved course having an arc of approximately ninety degrees.

6. Apparatus as defined in claim 5 in which a group of straight modules is located end-to-end with one another along each side of said path, the track of one of said straight modules of each group having one end disposed end-to-end with the track of a curved module at one end of said path and having an opposite end disposed end-to-end with the track of an adjacent straight module of the group, the track of another straight module of each group having one end disposed end-to-end with the track of a curved module at the opposite end of said path and having an opposite end disposed end-to-end with the track of an adjacent straight module of the group.

7. Apparatus as defined in claim 5 in which all of said straight modules are identical to one another, one of the curved modules at each end of said path being a left-hand module and the other curved module at each end of the path being a right-hand module, modules of a corresponding hand being positioned at opposite ends of said path adjacent opposite sides thereof.

8. Apparatus as defined in claim 4 in which each curved module includes a straight track section adjacent the curved track of the curved module, the conveyors of said curved modules also being adapted to advance said pallets along a straight course along said straight track sections.

9. Apparatus as defined in claim 4 in which the conveyors of all of said modules are of the same linear length.

10. Apparatus as defined in claim 3 in which the motor of each module is located at the downstream end of the module and is driven in a direction to cause the respective conveyor to pull said pallets along said path.

11. Apparatus as defined in claim 3 further including means for releasably fastening adjacent modules in rigid relation to one another.

12. Apparatus as defined in claim 1 in which each of said clamps comprises a pair of opposing jaws with at least one of said jaws being movable toward and away from the other jaw, and means for resiliently biasing said one jaw of each clamp toward the other jaw thereof.

* * * * *